United States Patent [19]
Lennard

[11] Patent Number: 6,007,881
[45] Date of Patent: Dec. 28, 1999

[54] TAXIDERMY SYSTEM AND METHOD

[76] Inventor: Scott A. Lennard, 40320 Hwy. 34, Forestburg, S. Dak. 57314

[21] Appl. No.: 09/023,332

[22] Filed: Feb. 13, 1998

[51] Int. Cl.$^6$ ..................................................... B32B 17/00
[52] U.S. Cl. .......................... 428/16; 428/542.4; 40/800; 434/296; 156/57; 156/61
[58] Field of Search .................................. 428/16, 542.4; 40/800; 434/296; 156/57, 61

[56] References Cited

U.S. PATENT DOCUMENTS

| | | |
|---|---|---|
| 2,582,514 | 1/1952 | Swisher et al. . |
| 4,432,919 | 2/1984 | Rinehart . |
| 4,464,440 | 8/1984 | Dotzman .............................. 428/542.2 |
| 4,515,340 | 5/1985 | Rinehart . |
| 4,596,683 | 6/1986 | Powell .................................. 264/46.4 |
| 4,642,209 | 2/1987 | Powell . |
| 5,015,532 | 5/1991 | Knight . |
| 5,087,204 | 2/1992 | Thompson . |

Primary Examiner—Timothy M. Speer
Attorney, Agent, or Firm—Bachman & LaPointe, P.C.

[57] ABSTRACT

The present invention relates to a taxidermy system and method for recreating the head of an animal species. The taxidermy system comprises a taxidermy form in the shape of the head portion of the animal species, at least one eye socket in the taxidermy form and at least one eye insert to be placed within the at least one eye socket. Each eye insert is formed by a simulated eyeball and a capsule surrounding said eyeball. The capsule is formed from a flexible, shape memory material configured to have details such as representations of muscle, eyebrow, and eyelids. The method for recreating a head portion of an animal species comprises the steps of providing a taxidermy form in the shape of the head of the animal species, which head has at least one eye socket, providing at least one eye insert to be fitted within the at least one eye socket, the at least one eye insert having an eyeball and a capsule formed from a flexible material surrounding said eyeball, inserting the at least one eye insert into the at least one eye socket, placing a skin over the taxidermy form, and tucking a portion of the skin between an underside portion of the capsule and the eyeball.

16 Claims, 3 Drawing Sheets

TAXIDERMY SYSTEM AND METHOD

BACKGROUND OF THE INVENTION

The present invention relates to a taxidermy system and method for recreating the head portion of an animal species and, in particular to an eye insert used in said system and method.

The head of a taxidermy form contains eye sockets of the approximate size present in the skull of the corresponding animal. These sockets are, of course, much larger than the eye itself which in the live animal is positioned in the socket and held in place by various muscles and a protective cushion of connective tissue including the lids and the brows. Therefore, when modeling a taxidermy form to look lifelike and realistic, the eye must be set within this enlarged eye socket in a very correct and precise manner.

In the past, taxidermists have set glass eyes into the form and then have used clay to recreate the proper muscle and lid definition. This has to be done over and over again on each taxidermist mount. Shaping the clay to the proper definition is quite time consuming and the toughest part for an amateur taxidermist to master. Often, the clay is displaced when the taxidermist tries to put skin over it. Another problem faced by the taxidermist, especially amongst amateur taxidermists, is setting the eye into the body at the proper angle and depth.

Attempts have been made to do away with the use of clay. One such effort is exemplified in U.S. Pat. No. 4,477,500 to Powell. The Powell patent relates to an eye insert for a taxidermy form which includes an artificial eyeball and a base into which the eyeball is adapted to be partially set. The base is configured to be positioned within the eye socket and fixed against substantial adjustment. Alignment means, in the form of a tongue and groove arrangement, are carried by the base and socket, respectively. Unfortunately, the eye insert disclosed in the Powell patent does not readily lend itself to use with taxidermy techniques such as the eye tuck method for placing skin over the eyelids.

SUMMARY OF THE INVENTION

Accordingly, it is an object of the present invention to provide an improved system and method for taxidermists to set eyes into a taxidermy form.

It is a further object of the present invention to provide a system and method as above which causes an eye to be set at the proper angle and depth.

It is yet another object of the present invention to provide a system and method as above which allows the taxidermist the flexibility to change the rotation of the eyes.

The foregoing objects are attained by the taxidermy system and method of the present invention.

In accordance with the present invention, a taxidermy system for setting eyes into a taxidermy form comprises a taxidermy form in the shape of the head portion of the animal species, at least one eye socket in the taxidermy form and at least one eye insert to be placed within the at least one eye socket. Each eye insert is formed by a simulated eyeball and a capsule surrounding said eyeball. The capsule is formed from a flexible, shape memory material configured to have muscle and eyebrow and eyelid detail.

The method for recreating a head portion of an animal species comprises the steps of providing a taxidermy form in the shape of the head of the animal species, which head has at least one eye socket, providing at least one eye insert to be fitted within the at least one eye socket, the at least one eye insert having an eyeball and a capsule formed from a flexible material surrounding said eyeball, inserting the at least one eye insert into the at least one eye socket, placing a skin over the taxidermy form, and tucking a portion of the skin between an underside portion of the capsule and the eyeball.

Other details of the system and the method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

While the present invention will be described in the context of setting an eye into the head of a deer, it should be apparent that the present invention is equally adaptable and applicable to taxidermy forms of many other species. For example, the system and the method of the present invention could be used to place the eyes into the head of a mountain lion taxidermy form.

Figure 1:
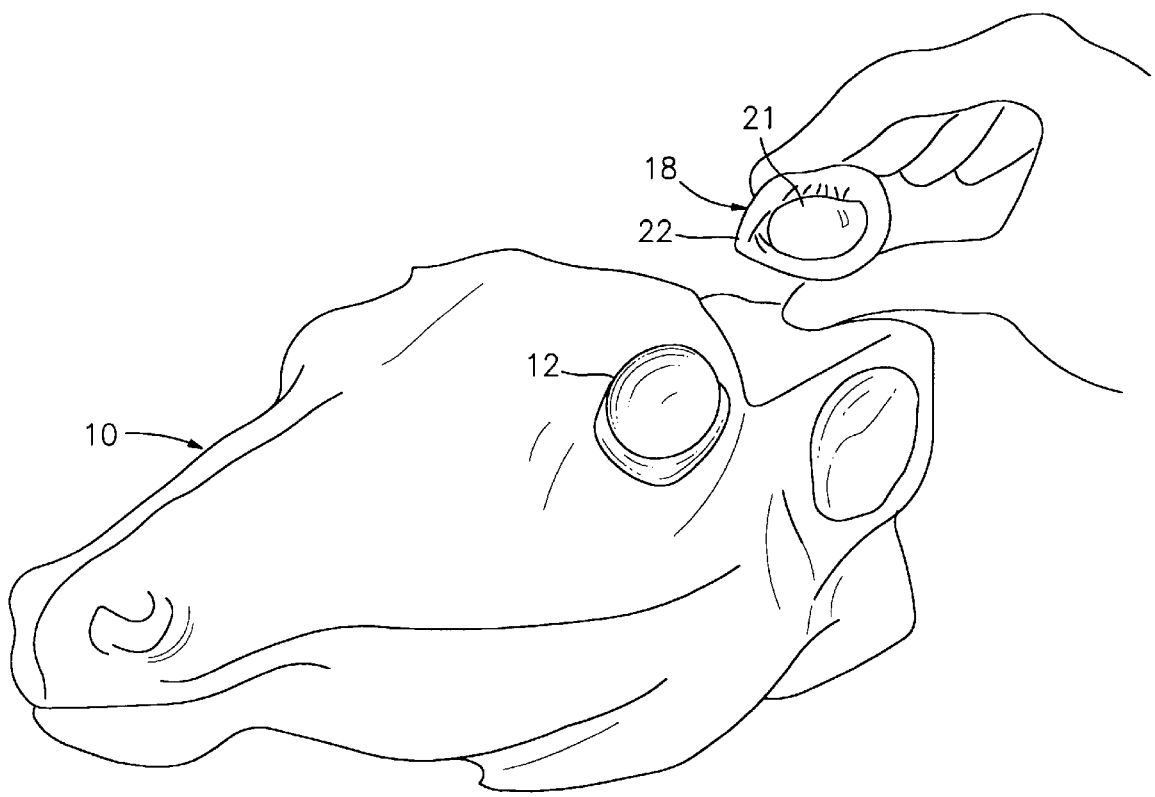
FIG. 1 is a perspective view of the head portion of a deer and an eye insert to be placed in an eye socket in the head portion.

Referring now to the drawings, FIG. 1 illustrates a taxidermy form 10 in the shape of a head portion of a deer. While the form 10 has been illustrated as having a single eye socket 12, it should be recognized of course that the form 10 typically has two such sockets. The taxidermy form 10 can be made out of any desired material, for example urethane foam and polyurethane foam.

Each eye socket 12 is formed by substantially planar peripheral walls 16 configured to have the shape of a real horse's eyeball socket. Each eye socket 12 also has a substantially planar rear wall (not shown) and a depth which allows the eye insert 18 to have its rear surface 20 abut the rear wall of the eye socket and still partially project out of the eye socket 12.

Figure 2:
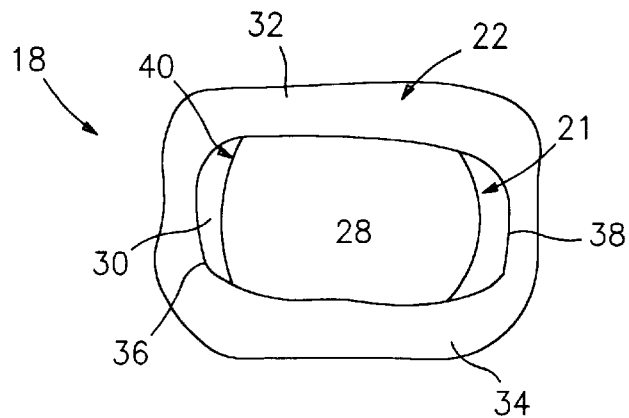
FIG. 2 is an enlarged front view of the eye insert.
Figure 3:
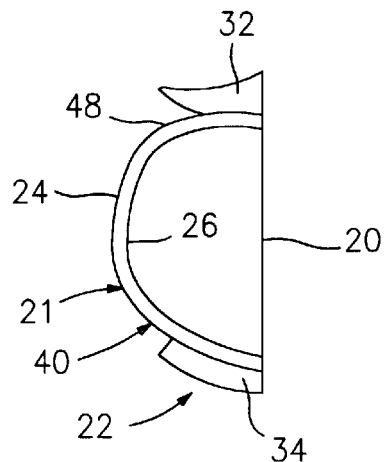
FIG. 3 is a sectional view of the eye insert taken along lines 3—3.
Figure 4:
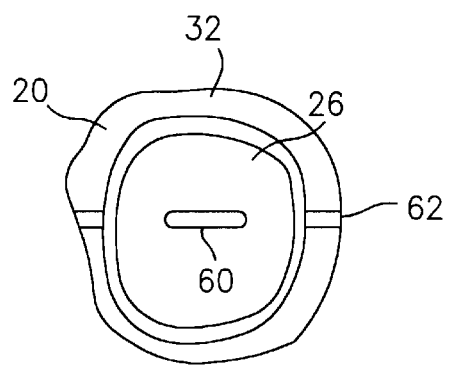
FIG. 4 is a rear view of the eye insert of FIG. 2.

The eye insert 18 has two components. The first is an eyeball 21 and the second is a capsule 22 which surrounds the eyeball 21. Referring now to FIGS. 2–4, the eyeball 21 is preferably a glass eyeball having an accurately shaped front surface 24 and an accurately shaped rear surface 26. While it is preferred that the rear surface 26 have an accurate shape which matches the shape of the front surface 24, it should be apparent that the rear surface 26 could be planar if so desired. The front surface 24 of the eyeball preferably has a pupil 28 and a white portion 30. The front surface 24 could be such that the eye looks either to the left or the right, depending on which side of the head portion it is inserted, by displaying the white portion in the front or back corner of the eye. Alternatively, the white portion could be displayed so as to create a normal forward looking eye.

The capsule 22 is preferably formed from a flexible material which has sufficient memory to maintain its shape.

In addition to being flexible, the material used to form the capsule 22 should be compressible so that the capsule 22 is more easily inserted into and held in the eye socket 12. Suitable materials from which the capsule 22 can be formed include flexible urethane material, polyethylene, polyvinylchloride, vinyl, polypropylene, flexible urethane, and thermoplastic elastomer. Again referring to FIGS. 2–4, the capsule 22 is formed so as to have an upper portion 32 in the shape of an eyelid and an eyebrow and a lower portion 34 in the shape of eye muscle and/or tissue. The upper portion 32 and the lower portion 34 are joined by sidewall portions 36 and 38 to define a cavity 40 into which the eyeball 21 is inserted.

Figure 5:
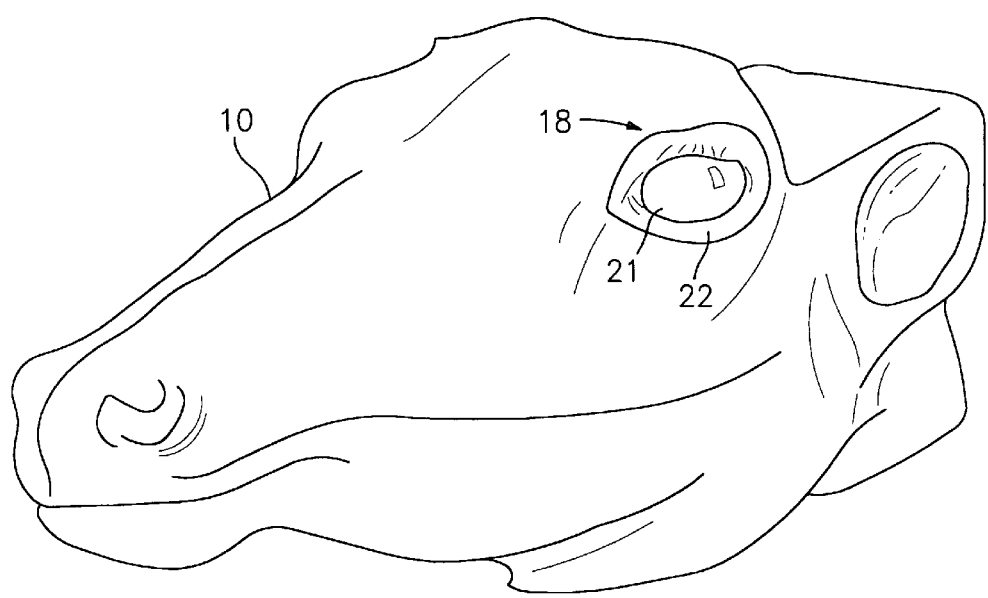
FIG. 5 is a perspective view of the head portion of FIG. 1 with the eye insert in place.

The outer periphery 42 of the capsule 22 is shaped to fit into the eye socket 12. The rear surface 20 of the capsule 22 is substantially planar so as to allow the rear of the capsule to abut against the rear wall of the eye socket. By configuring the outer periphery 42 and the rear surface 20 in this way, the capsule 22 articulates into the preformed eye socket 12 so that the eye is automatically set at the proper angle and depth as shown in FIG. 5.

To insure that the eyeball 21 is correctly positioned within the capsule 22, the rear surface 26 of the eyeball 21 is provided with an indexing means such as straight line portion 60 and the rear surface 20 of the capsule 22 is provided with reference means such as reference lines 62. When the straight line portion 60 is aligned with the lines 62, the eyeball 21 is correctly positioned within the capsule 22.

If desired, a taxidermist can apply an adhesive material (not shown) to the rear surface 20 to affix the eye insert into the eye socket 12. The adhesive material could be hot glue or an epoxy material. Alternatively, clay can be inserted between the rear surface 20 and the rear wall of the eye socket.

Figure 6:
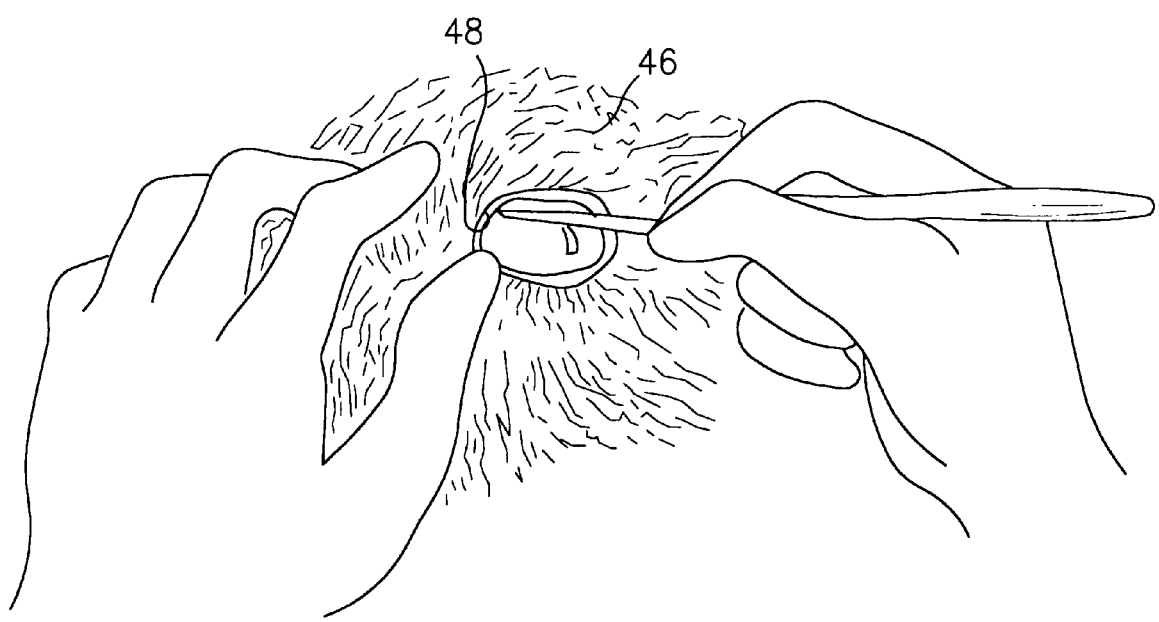
FIG. 6 is a view of a taxidermist tucking a skin over an eyelid portion of the eye insert.

Referring now to FIG. 6, the recreation of the head portion is completed by placing a skin 46 over the form 10. Typically, the skin 46 is glued to the form 10. In the past, there have been problems correctly positioning the skin over the eyelid and eyebrow portions. When the eyelid and the eyebrow were formed from clay, positioning the skin would often cause the clay to shift and lose shape. This is a problem avoided by the system of the present invention. Due to the material from which it is formed, placement of the skin 46 over the eyelid and eyebrow portion 32 does not cause the capsule 22 to lose its shape. In fact, the flexible material forming the capsule 22 allows the skin 46 to be tucked between the eyeball 21 and the underside 48 of the eyelid portion 32. The material forming the capsule 22 also has sufficient tension due to its flexible and elastic nature that the skin 46 so tucked will be held in place while the adhesive used to bond the skin 46 to the form and the eyelid and eyebrow portion dries.

It is often desirable to adhesively bond the skin 46 to the eyelid and eyebrow portion 32. In such instances, the eyelid and eyebrow portion may be roughened such as by sanding to increase the adhesion of the bonding agent. When it is necessary to roughen the eyelid and eyebrow portion in this manner, the taxidermist can easily remove the eyeball 21 due to the flexible nature of the capsule material and later reinsert the eyeball 21. In this way, the taxidermist can avoid scratching or otherwise damaging the eyeball 21.

As can be seen from the foregoing discussion, the taxidermy method of the present invention involves forming an eye insert 18 by inserting an eyeball 21 into a capsule 22 and aligning the straight line portion 60 with the reference lines 62. The eye insert 18 is then placed into an eye socket 12 in the head portion 10 of an animal species being recreated. If desired, an adhesive material may be applied to the rear surface of the eye insert 18 prior to inserting it into the eye socket. Thereafter, a skin 46 is placed over the head portion. A portion of the skin 46 is placed over the eyelid and eyebrow portion 32 of the eye insert. If desired, the eyelid and eyebrow portion 32 can be roughened and adhesive material applied to it. If the eyelid and eyebrow portion 32 is to be roughened such as by sanding, the eyeball 21 is removed from the eye insert 18 prior to roughening. After the skin portion has been glued to the eyelid and eyebrow portion 32, skin material extending beyond the eyelid and eyebrow portion is tucked between the underside 38 of the capsule and a portion of the front surface 24 of the eyeball 21. In this way, a realistic recreation of the head portion of the animal species is created.

The taxidermy system and method of the present invention have numerous advantages. It is for example a better, quicker, easier way for taxidermists to set eyes. The system and method of the present invention also allow taxidermists the flexibility to change the rotation of the eyes. They also permit taxidermists to set the eyes at the proper angle and depth.

Since the eyeball can be removed from the eye insert of the present invention, the system allows the taxidermist to put pre-rotated eyes into the capsule either looking to the left or looking to the right depending on which way the eye is inserted. In other words, the white can be displayed in the front or back corner of either eye. Also, it lends itself to the installation of traditional eyes.

Another advantage to the taxidermy system and the method of the present invention is that they do not require any tongue or groove system in order to properly orient the eye insert within the eye socket.

While the capsule 22 has been described as having an upper surface 32 shaped to recreate the eyebrow and eyelid of a deer, it should be recognized that the particular configuration of the upper surface of the capsule, as well as its other surfaces, depends upon the particular type of animal being recreated by the taxidermist.

It is apparent that there has been provided in accordance with the present invention a taxidermy system and method which fully satisfies the means, objects and advantages set forth herein. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A taxidermy system for recreating the head of an animal species which comprises:

a taxidermy form in the shape of the head of said animal species;

at least one eye socket in said taxidermy form; and at least one eye insert to be placed within said at least one eye socket;

each said eye insert comprising a simulated eyeball and a capsule surrounding said eyeball; and said capsule being formed from a flexible, shape memory material configured to have details representative of said animal species.

2. The taxidermy system of claim 1 wherein said capsule completely surrounds said eyeball and has a substantially planar rear surface.

3. The taxidermy system of claim 1 further comprising:

skin to be placed over a portion of said capsule; and said capsule material being sufficiently flexible to allow said skin to be tucked between an underside portion of said capsule and said eyeball and having sufficient tension to hold said skin in place.

4. The taxidermy system of claim 1 wherein said capsule is formed from a flexible urethane material.

5. The taxidermy system of claim 1 wherein said eyeball has an arcuately shaped outer surface and an arcuately shaped inner surface.

6. The taxidermy system of claim 1 wherein said eyeball has means for indexing said eyeball located on a rear surface of said eyeball and a rear surface of said capsule having at least one reference mark for insuring that said eyeball is positioned correctly when said indexing means is aligned with said at least one reference mark.

7. The taxidermy system of claim 1 wherein said indexing means comprises a straight line portion on said rear surface of said eyeball.

8. The taxidermy system of claim 1 wherein said capsule is sufficient flexible that said eyeball can be removed.

9. The taxidermy system of claim 1 further comprising means for adhesively placing said at least one eye insert into said at least one eye socket.

10. A method for recreating a head portion of an animal species comprising the steps of:

providing a taxidermy form in the shape of the head of said animal species, said head having at least one eye socket;

providing at least one eye insert to be fitted within said at least one eye socket, said at least one eye insert having an eyeball and a capsule formed from a flexible material surrounding said eyeball;

inserting said at least one eye insert into said at least one eye socket;

placing a skin over said taxidermy form; and tucking a portion of said skin between an underside portion of said capsule and said eyeball.

11. The method of claim 10 further comprising:

adhesively bonding said at least one eye insert to said eye socket prior to said skin placing step.

12. The method of claim 11 wherein said adhesive bonding step comprises applying hot glue to a rear surface of said capsule and inserting said at least one eye insert into said at least one eye socket.

13. The method of claim 11 wherein said adhesive bonding step comprises applying epoxy to the rear surface of said capsule and inserting said at least one eye insert into said at least one eye socket.

14. The method of claim 11 wherein said adhesive bonding step comprises inserting clay between a rear surface of said capsule and a surface of said at least one eye socket.

15. The method of claim 10 further comprising:

roughening a portion of said capsule positioned over said eyeball; and applying an adhesive material to said roughened portion to hold said skin in place.

16. The method of claim 15 further comprising:

removing said eyeball from said at least one eyeball insert prior to said roughening step.

* * * * *